J. E. LONERGAN.
Lubricator.
No. 9,164. Reissued April 20, 1880.
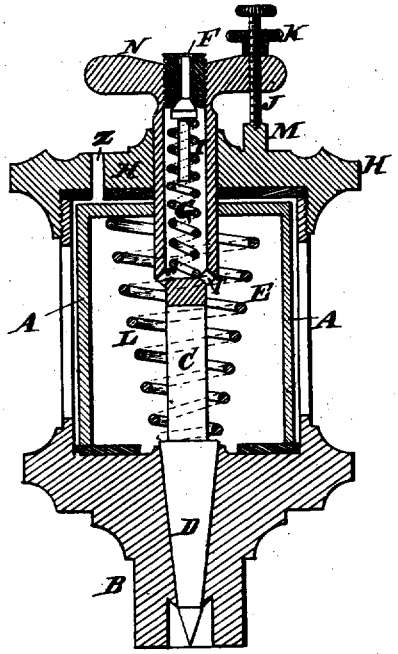
Attests
Thos. Kinsler
Wm. H. Carson.
Inventor
John E. Lonergan
by George E. Buckley
his Atty.
N. PETERS, PHOTO-LITHOGRAPHER, WASHINGTON, D.C.

UNITED STATES PATENT OFFICE.

JOHN E. LONERGAN, OF PHILADELPHIA, PENNSYLVANIA.

LUBRICATOR.

SPECIFICATION forming part of Reissued Letters Patent No. 9,164, dated April 20, 1880.

Original No. 132,477, dated October 22, 1872; Reissue No. 5,796, dated March 17, 1874. Application for reissue filed February 10, 1880.

*To all whom it may concern:*

Be it known that I, JOHN E. LONERGAN, late of Sacramento, Sacramento county, State of California, now of Philadelphia, Pennsylvania, have invented an Improved Lubricator; and I do hereby declare the following description and accompanying drawing to be sufficient to enable any person skilled in the art or science to which it most nearly appertains to make and use my said invention or improvement without further invention or experiment.

My invention relates to an improved oil-cup or lubricator for journals and other frictional surfaces, and is particularly adapted for use on locomotive-engines.

In order to explain my invention so that others will be able to understand its construction and operation, reference is had to the accompanying drawing, forming a part of this specification, in which the figure is a vertical sectional elevation.

A represents a cup, which, in the present instance, is composed of an outer skeleton metal frame and an inner glass vessel, so united that the oil will be held inside of the glass vessel without leaking.

The stem B, which extends downward from the center of the bottom of the cup, has a hole, I, passing through it, the upper end of which, where it opens into the cup, is made conical.

A spindle, C, passes down through the center of the upper end of the cup, and has at its lower end a conical plug, D, which fits into the conical hole in the stem B, so as to completely close the hole, where it is allowed to rest freely in it; but by slightly elevating this stem a space will be opened entirely around the plug, through which the oil will flow and drop from the apex of the cone, corresponding in quantity to the size of the opening. A hole, Z, in the top serves as a vent. A spiral spring, L, is coiled around the spindle, so as to bear at its lower end against the enlargement of the upper end of the cone D. The upper end of the spindle C is somewhat enlarged, and is made to fit closely in the plain hole in the center of the cup, or upper end, H, of the cup, through which it passes.

A small horizontal thumb-wheel, N, is formed at the top of the spindle C above the cup, by which the spindle can be readily turned, for the purpose hereinafter described.

A hole, I, passes down through the upper end of the spindle C and through its enlarged portion, and communicates by openings I′ with the interior E of the cup. The upper end of this hole is closed by a pierced screw-plug, and this plug is closed by a valve, F, which is pressed upward against a conical seat by a spiral or other spring, G, inside of the hole I of the enlarged portion of the spindle C. This hole serves as a passage for the oil in replenishing the cup, as by depressing the valve F the oil can be poured directly into the upper end of the hole, through which it will pass into the cup.

The spring G keeps the valve tightly closed and prevents the entrance of the dust into the cup. It also prevents the oil from being thrown out of the cup by motion of the engine or piece of machinery upon which it is fixed.

In order to regulate the feed of the cup I employ a vertical set-screw, J, which passes down through the rim of the thumb-wheel N, and which can be fixed at any desired point by a locking thumb-screw, K, or other equivalent device.

On the upper end of the cup, in a position to receive the lower end of the screw J, I secure a projection, M, which has a depression on its upper face. By turning the spindle the set-screw J can be brought directly over this projection, when, by turning the screw down, so that its lower end will rest in the depression or concavity in the upper face of the projection, the spindle can be raised as desired, so as to lift the conical plug D and allow the oil to feed out through the stem B.

When it is desired to cease feeding the oil it is only necessary to lift the spindle and turn it slightly, so as to let it descend without allowing the screw to rest upon the projection M. This allows the plug D to completely close the feed-opening, and when it is desired to again feed the oil it will only be necessary to lift the spindle and turn it until the screw rests upon the projection, and thus preserve the exact quantity of feed which was previously had.

The enlarged upper part of the spindle C, as will be seen, slides freely up and down through the plain opening in cap H.

The wheel N is a flat round disk, which is set upon the upper end of stem C, and projects laterally in different directions from the point where it joins the stem, the screw J being passed down through it on one side at the same distance from the middle line of the stem as the projection M, so that it may be made to rest upon the latter.

I am aware of the United States Letters Patent Nos. 20,665, of 1858, and 76,616, of 1868, and I do not claim them as my invention, one of the distinguishing features of my device being its adjustable feed, the adjustability being secured by means of a screw which raises or lowers the stem C, and when the apparatus is in use a continuous supply of oil is furnished to the joint of machinery to be lubricated.

Having thus described my invention, what I claim as new, and desire to secure by Letters Patent, is—

1. In an oil-feeding mechanism, the combination of cup A, to contain the oil, seat B, and valve-stem C, having a plug end, D, beneath, to close the opening in the seat, the stem C being vertically adjustable by means of a screw, and passing through the cap H by means of a plain opening, in which it slides freely up and down, substantially as and for the purposes described.

2. In an oil-feeding mechanism, the combination of cup A, to contain the oil, seat B, valve-stem C, vertically adjustable by means of a screw, said stem passing through a plain opening in the cap H, and a spring, L, resting against a shoulder or projection on the stem to hold the latter down in place, substantially as described.

3. In an oil-feeding mechanism, the combination of cup A, seat B, valve-stem C, the latter passing through a plain opening in the cap H, and a vertical screw, J, whereby the stem is rendered adjustable up and down, substantially as described.

4. In an oil-feeding mechanism, the combination of a cup, A, valve-stem C, adjustable to any desired feed by means of a screw to raise and lower it, and a spring, L, the valve-stem passing through a plain hole in the top of the cup, the said stem being arranged substantially as described.

5. The spindle C, having the hole I passing through its upper end and communicating with the interior of the cup, in combination with the valve F and spring G, substantially as and for the purpose above described.

6. The vertical set-screw J, in combination with its locking thumb-screw K and projection M, substantially as and for the purpose set forth.

7. The projection M, having a depression in its upper face, in combination with the set-screw J and the spiral spring L, substantially as set forth.

JOHN E. LONERGAN.

Witnesses:

GEORGE E. BUCKLEY,
W. H. JOHNSTONE.